United States Patent
Dauvergne

Patent Number: 6,129,406
Date of Patent: Oct. 10, 2000

[54] DASHBOARD

[75] Inventor: Jean Dauvergne, Gondecourt, France

[73] Assignee: Plastic Omnium Auto Interieur, Gondecourt, France

[21] Appl. No.: 09/068,672

[22] PCT Filed: Dec. 5, 1996

[86] PCT No.: PCT/FR96/01948

§ 371 Date: May 14, 1998

§ 102(e) Date: May 14, 1998

[87] PCT Pub. No.: WO97/22510

PCT Pub. Date: Jun. 26, 1997

[30] Foreign Application Priority Data

Dec. 19, 1995 [FR] France ................................ 95 15591

[51] Int. Cl.⁷ .................................................. B60K 37/00
[52] U.S. Cl. ................................................ 296/70; 180/90
[58] Field of Search .......................... 296/70, 194, 185; 180/90

[56] References Cited

U.S. PATENT DOCUMENTS

| | | | |
|---|---|---|---|
| 4,559,868 | 12/1985 | Nonaka et al. | 180/90 |
| 4,634,735 | 1/1987 | Theirsault et al. | 525/88 |
| 4,709,943 | 12/1987 | Yoshimura et al. | 180/90 |
| 4,937,030 | 6/1990 | Nishiyama et al. | 264/162 |
| 5,273,310 | 12/1993 | Terai | 296/70 |
| 5,311,960 | 5/1994 | Kukainis et al. | 296/70 |
| 5,487,800 | 1/1996 | Ash | 296/70 |
| 5,709,358 | 1/1998 | Kubota | 296/70 |
| 5,857,726 | 1/1999 | Yokoyama et al. | 296/70 |
| 5,883,777 | 4/1999 | Nishitani et al. | 296/70 |

Primary Examiner—D. Glenn Dayoan
Assistant Examiner—Lori L. Coletta
Attorney, Agent, or Firm—Harrison & Egbert

[57] ABSTRACT

A dashboard for a vehicle which allows for an integration of internal instruments and accessories into a cavity in a front body panel of the vehicle. The dashboard includes a solid block of material which fill the cavity in the front body panel. At least one location is formed in the block of material. This location is capable of supporting the internal instruments and accessories. The block of material is supported by at least one rigid cross member secured to the vehicle.

8 Claims, 5 Drawing Sheets

DASHBOARD

TECHNICAL FIELD

The present invention relates to a dashboard for a vehicle, in particular a land vehicle.

Although more especially developed for such applications, it can also be used in all waterborne craft and/or aircraft. More generally speaking, it will be possible, moreover, to implement it, as an inside arrangement or trim grouping together different items of instruments and accessories and/or equipment, in all fields of industrial activity in which one encounters operator's cabs, control stations, supervisory positions or the like, whether it be in fixed or mobile installations.

BACKGROUND ART

At the present time, dashboards are generally constituted by a panel formed by an insert of moulded plastic or metallic material, or of dished sheet metal, possibly covered with a skin.

They define a shell-shaped screen, locally provided with openings, and thus serve, in particular, to conceal, in the cavity defined between the front body panel of the vehicle and the shell, numerous housings and/or conduits, capable of supporting the equipment, instruments and accessories and air conditioning systems and/or electrical systems provided in this area.

The housing or conduits are, most often, secured to the dashboard on their rear faces, with some of them emerging in the area of the openings.

Those devices presently known thus have the disadvantage of being difficult to manufacture. A large number of operations are needed, in fact, to install the housings and/or conduits. In addition, to effect such mounting operations it is necessary to turn the dashboards round and/or to carry out operations 'blind'.

Numerous dashboards thus produced therefore present an appreciable number of defects or examples of faulty workmanship, and additional work has to be carried out on them, which further increases their cost.

IT can also be noted that presently known dashboards are fragile to a certain extent, in particular on account of contrasts in thickness between thin areas and thicker areas of the panels that form them.

The object of the present invention is to provide a vehicle dashboard that overcomes the aforementioned drawbacks and makes it possible to reduce the number of operations needed to install this part of the vehicle.

Another object of the present invention is to provide a vehicle dashboard that enables mounting to be effected without turning the dashboards round and without having to work 'blind'.

Another object of the present invention is to provide a vehicle dashboard that facilitates the repair of the different items of instruments and accessories and/or equipment provided in this area by favouring access thereto and/or their removal Another object of the present invention is to provide a vehicle dashboard that makes it possible to reduce the number of parts to be used to form, mount and/or operate the different items of instruments and accessories and/or equipment provided in this area.

A further object of the present invention is to provide a vehicle dashboard that can be used in different models without having to make numerous changes to adapt it.

One advantage of the present invention is that it provides a vehicle dashboard with increased strength.

Another advantage of the present invention is that it provides a vehicle dashboard that makes it possible to reduce the noise level inside the passenger compartment of the vehicle.

Further objects and advantages of the present invention will emerge in the course of the description that follows, which is given only by way of illustration and is not intended to limit same.

SUMMARY OF THE INVENTION

The present invention relates to a vehicle dashboard, capable of permitting, at least, the integration of internal items of instruments and accessories and/or equipment of the vehicle, characterized by the fact that it is constituted by a solid block of material, having one or more locations, produced in the material of the block, capable of receiving the said item or items of instruments and accessories and/or equipment.

BRIEF DESCRIPTION OF THE DRAWING

The present invention will be more readily understood upon studying the following description, accompanied by the annexed drawings, which form an integral part thereof.

DETAILED DESCRIPTION OF THE INVENTION

The present invention relates to a dashboard for a vehicle, in particular a land vehicle.

Although more especially developed for such applications, it can also be used in all waterborne craft and/or aircraft. More generally speaking, it will be possible, moreover, to implement it, as an item of inside arrangement or trim grouping together different items of instruments and accessories and/or equipment, in all fields of industrial activity in which one encounters operators cabs, control stations, supervisory positions or the like, whether it be in fixed or mobile installations.

Figure 1:
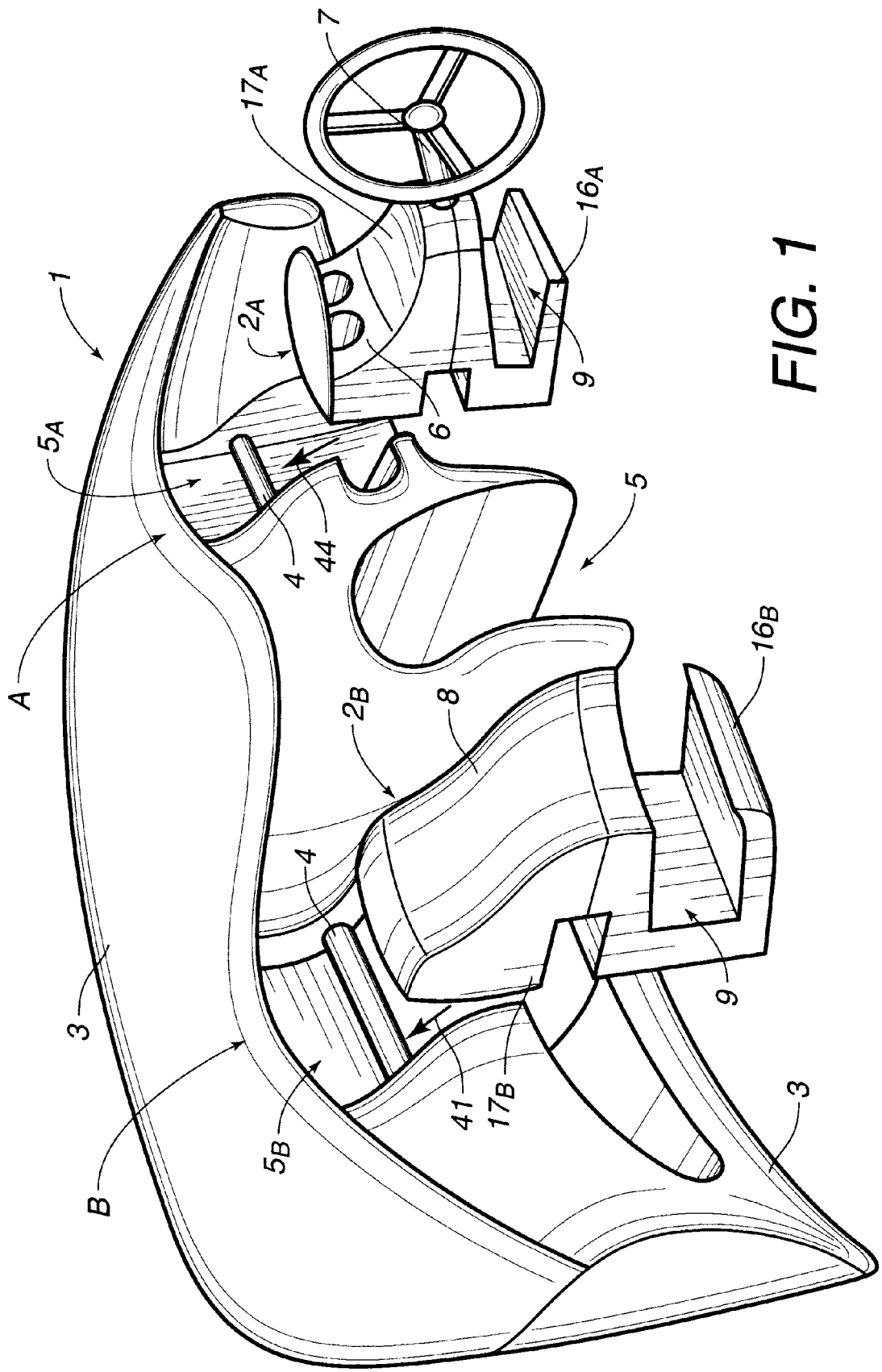
FIG. 1 schematically illustrates, in perspective, an example of a dashboard according to the invention.

FIG. 1 shows an example of a dashboard 1 according to the invention. The word 'dashboard' is to be taken as meaning, generally speaking, inside trim for a passenger vehicle as a sub-assembly of the body of the said vehicle, located at the front of its passenger compartment, capable of permitting, at least, the integration of items 2, $2_A$, $2_B$ of internal instruments and accessories and/or equipment of the vehicle.

According to the invention, dashboard 1 is constituted by a solid block 3 of material, in particular alveolar or cellular material, for example supported by at least one rigid cross member 4 fixed to the vehicle. The dashboard 1 thus has a "solid" appearance and the solid block of material 3 occupies the cavity previously defined between the front body panels and the dashboards of known vehicles.

As illustrated, block 3 has one or more locations, 5, $5_A$, $5_B$ produced in the material of the block, capable of receiving the item or items 2, $2_A$, $2_B$ of instruments and accessories and/or equipment.

The locations 5 thus constitute housings capable of supporting items 2. It is no longer necessary, therefore, by contrast with previously known dashboards, to provide numerous housings and their complex fixing arrangements to assemble the instruments and accessories and/or equipment on the dashboard.

In addition, as locations 5 are, in particular, accessible from the front face, items 2 can be mounted without turning the dashboard round and without having to work 'blind'.

According to one particular exemplary embodiment illustrated, items 2 are constituted, for example, by a combined instrument unit 6 comprising various indicating instruments useful for driving the vehicle, a steering column 7, a unit 8 for airbags, and various storage areas or glove compartments 9.

Figure 2:
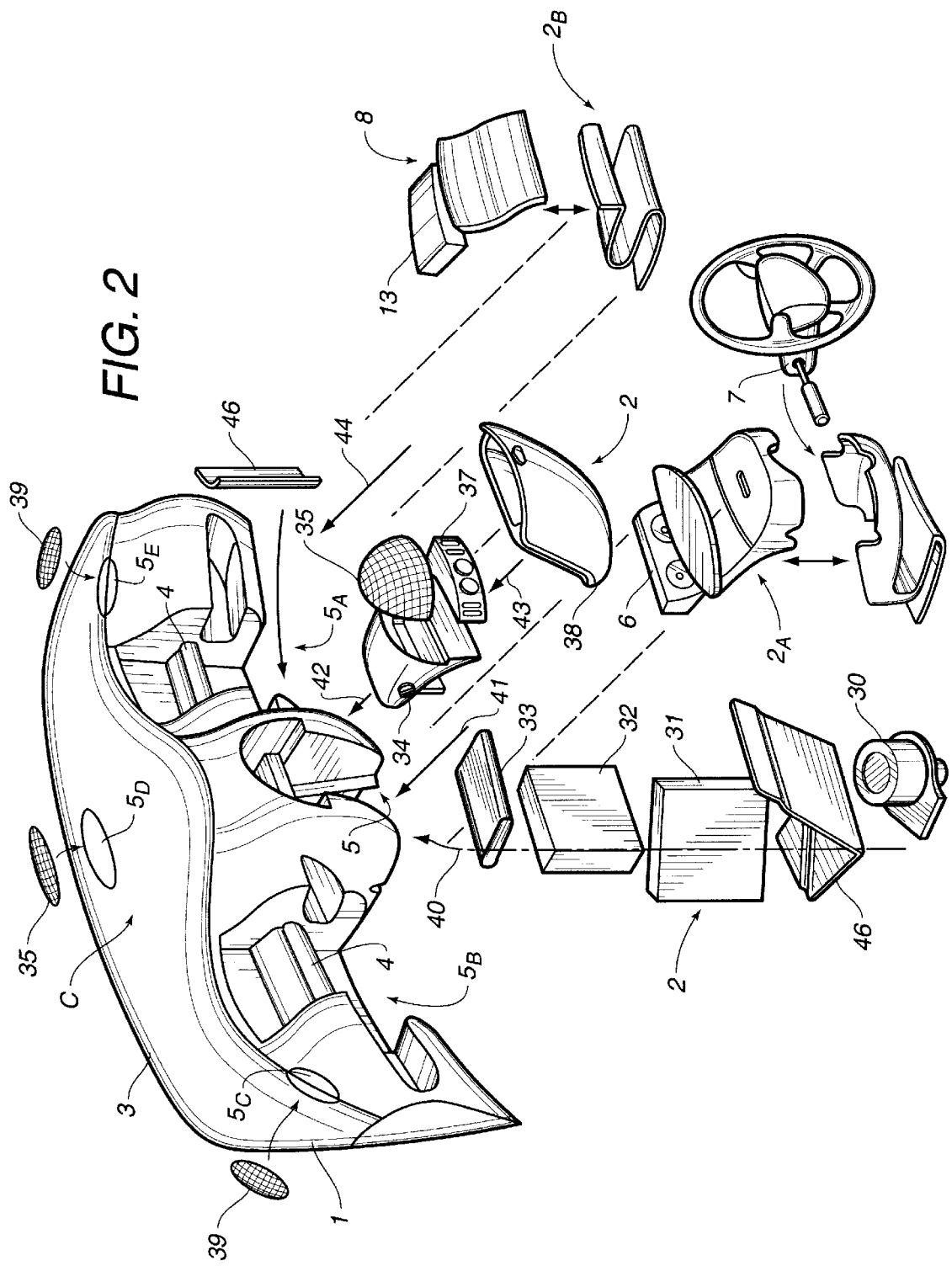
FIG. 2 is an exploded view of an example of a dashboard according to the invention.

These different items 2 are also to be seen in FIG. 2, wherein it will be noted that they can include, for instance, an air conditioning device comprising, among other things, a pulser and its motor 30, a filter 31, an evaporating means 32, a radiator 33, a central fan or ventilator 34, various ventilation-defrosting grilles 35 and/or a control system 37, as well as a car radio device including, for example, a support 38 and different loudspeakers 39 distributed over the dashboard 1.

They can also include, as applicable, fuse boxes, a pedal system, not shown and/or other items.

They are mounted, one after the other, in their respective locations 5, as illustrated by arrows 40–44.

According to the form of embodiment of the invention shown, the dashboard, thus equips the entire width of the vehicle passenger compartment and extends upwards, in particular, from the floor to the windscreen.

Still according to the exemplary form of embodiment illustrated, the block of material 3 surrounds cross member 4, at least, over a part of its length. In this connection, the cross member 4 is constituted, according to a first form of embodiment, by a lateral vehicle reinforcing bar.

This is, for example, a bar, orientated substantially transversely in relation to the vehicle and secured to the wings of the latter, for example in the area of the front door hinges.

According to other exemplary forms of embodiment, cross member 4 can also be formed, for example, of several pieces, secured at different levels of the bodywork.

This being, the cross member 4 is, in particular, designed so as to be accessible, at least partially, through certain locations $5_A$, $5_B$. It can thus be used as a support for items $2_A$, $2_B$ which are particularly sensitive or heavy.

Figure 3:
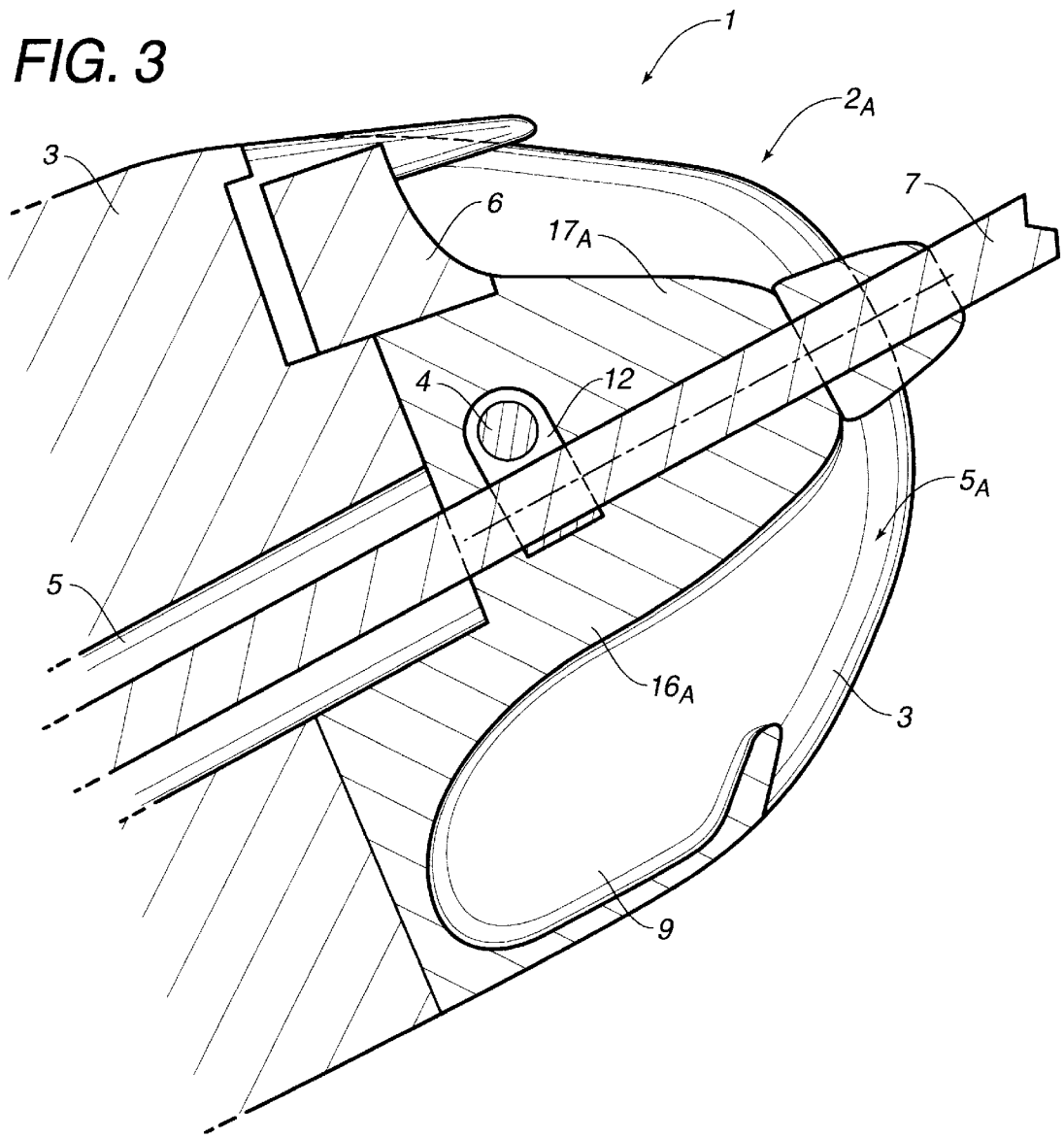
FIG. 3 is a cross-section effected in a vertical plane in the area marked A in FIG. 1.

FIG. 3 illustrates an example of this particular form of embodiment of the invention. It can thus be seen that the steering column 7 is secured to cross member 4, in particular, by means of a clamp 12.

Figure 4:
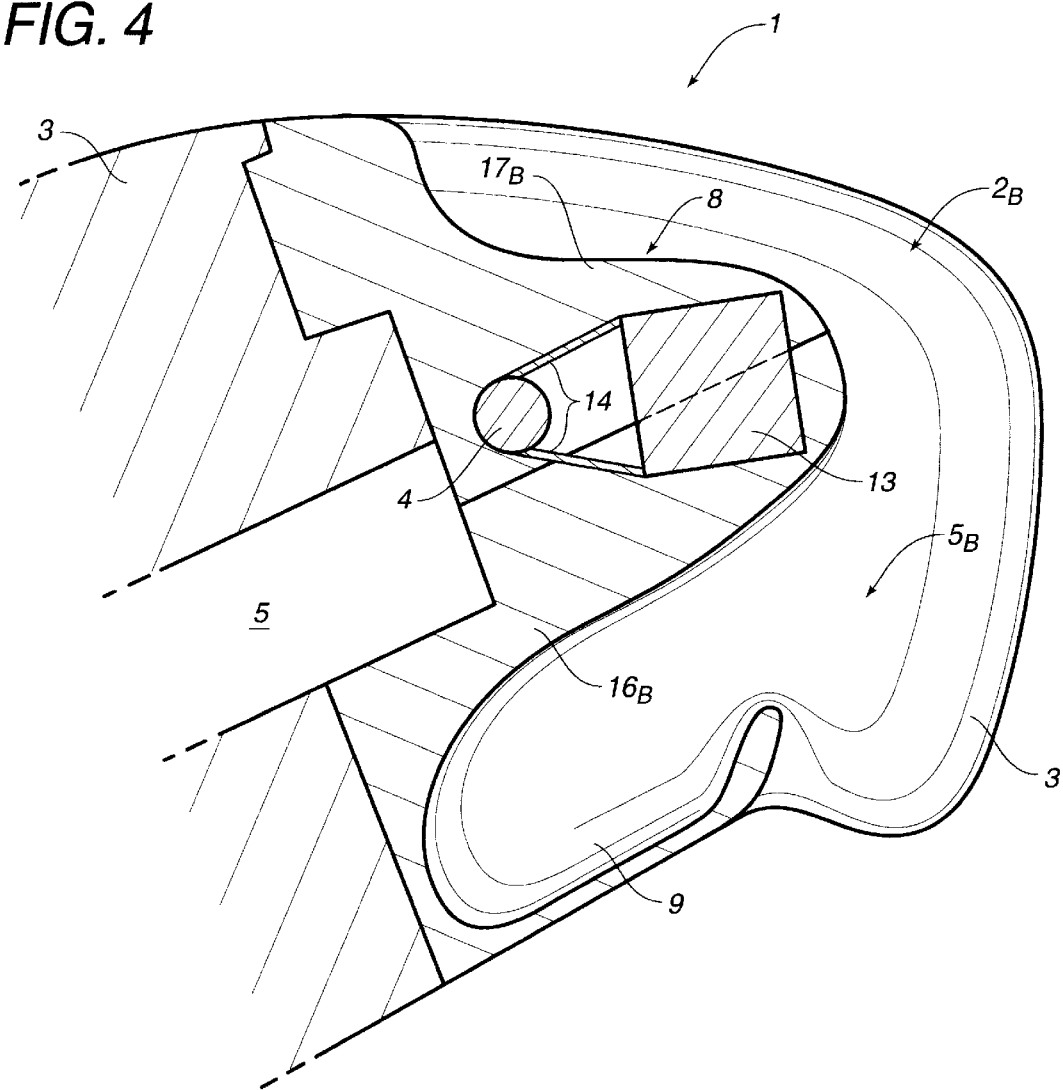
FIG. 4 is a cross-section effected in a vertical plane in the area marked B in FIG. 1.

Similarly, according to the example illustrated in FIG. 4, it will be seen that an airbag 13 of airbag unit 8 is secured to cross member 4, in particular by means of arms 14.

The solid block of material 3 is constituted, for example, by an expanded synthetic material. This can be, for instance, expanded polystyrene and/or polypropylene.

Such a material can be obtained, using techniques known to a man of the art, for example, through the cohesion of beads welded together, in particular by local melting under pressure.

Furthermore, the block of material 3 has, at least partially, for example, a surface treated in such a way as to enhance its appearance and/or is clad with a skin.

It may further be noted that, in the event of an expanded material being used, the choice of the material selected to constitute block 3 will facilitate the surface treatment. If wished, the use of a specific cladding layer can thus be avoided.

As illustrated in FIGS. 1 to 4, one and the same location 5 is capable, in particular, of receiving different items 2. By way of example, the two locations $5_A$, $5_B$, in particular identical and disposed symmetrically in relation to the plane of symmetry of the vehicle, can accommodate items $2_A$ or $2_B$ equally well.

It is thus possible, for instance, to interchange, as illustrated in FIGS. 1 and 2, driver side and passenger side items $2_A$, $2_B$. The invention thus makes it possible to use one and the same dashboard 1 for vehicles with right hand drive and for those with left hand drive, only a minimal number of adaptations being necessary for such an operation.

To facilitate this operation, block of material 3 has the same profile in the area of the said locations $5_A$, $5_B$.

According to one particular form of embodiment of the invention, items 2 constitute functional units, capable of being inserted into the said locations 5, formed by specific sub-modules.

Thus, according to the example illustrated in FIG. 3, items $2_A$ provided on the driver side constitute a driving position, capable of being inserted into locations $5_A$, $5_B$.

The driving position is formed, in particular, by a lower module $16_A$, an upper module $17_A$, and, between these two, the steering column 7.

Lower module $16_A$ includes, for example, the fuse box, not shown. Upper module $17_A$ comprises, in particular, combined instrument unit 6.

In FIG. 4, items $2_B$ constitute, for example, a passenger position, capable of being inserted into locations $5_B$, $5_A$.

The passenger position is formed, in particular, by a lower module $16_B$ and by an upper module $17_B$, including, among other things, airbag unit 8.

Figure 5:
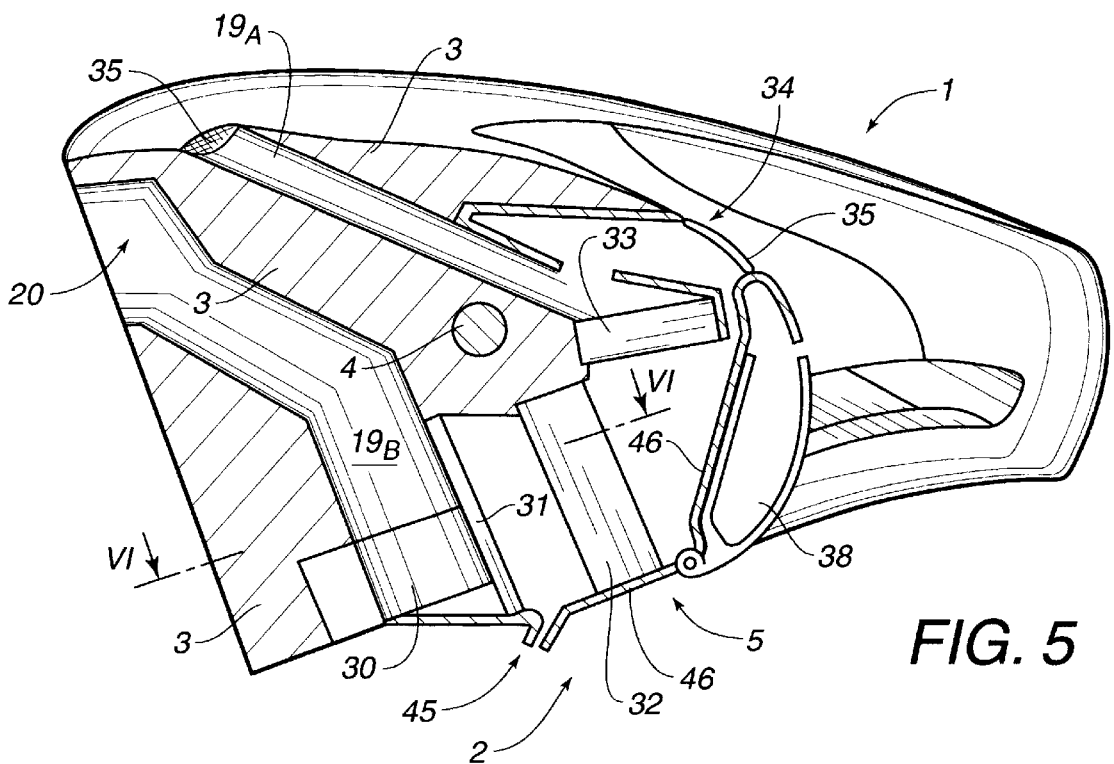
FIG. 5 is a cross-section effected in a vertical plane in the area marked C in FIG. 2.

In FIG. 5, as mentioned earlier, the pulser and its motor 30, filter 31, evaporating means 32, radiator 33 and central ventilator 34 constitute, for example, an air conditioning device 45, capable of being inserted into location 5, provided in middle area C.

It should be noted, moreover, that the device 45 is closed, among others, by one or more covers 46 contributing, in particular, to the channelling and tightness of circulation of the air flow.

The covers 46 are formed, in particular, by injected polypropylene.

Figure 6:
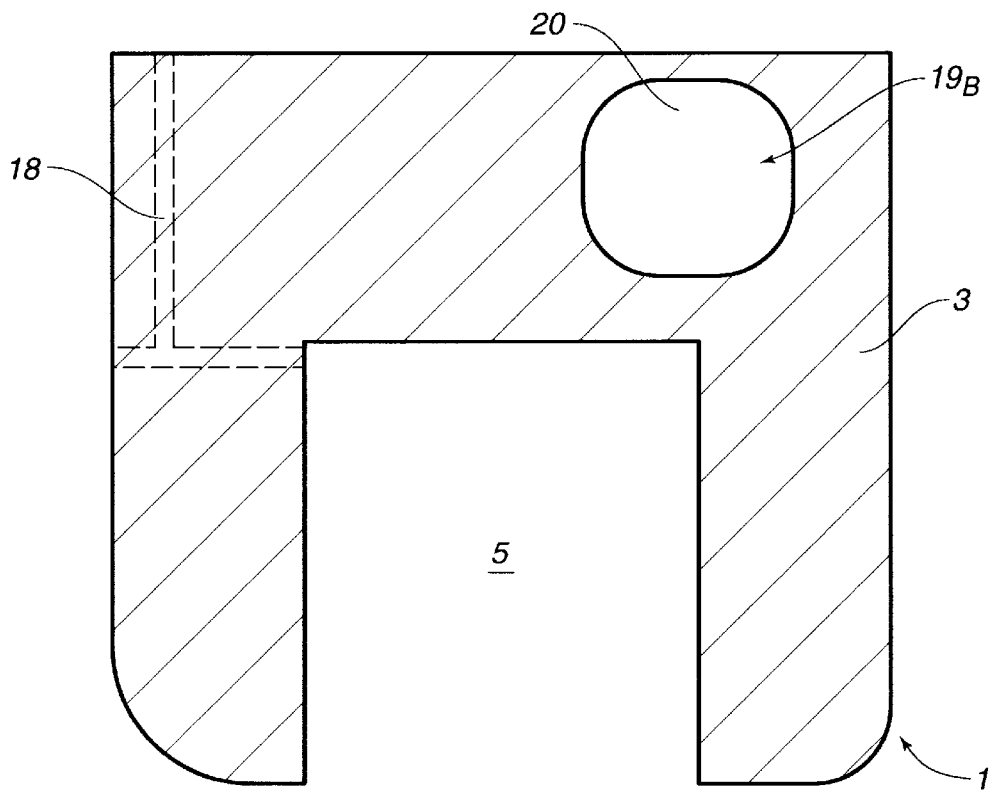
FIG. 6 is a cross-sectional view along line VI—VI of FIG. 5.

With reference, also, to FIGS. 5 and 6, it will be noted that block 3 is also further capable, for example, of forming electrical system conduits 18 and/or air flow conduits $19_A$, $19_B$.

In the example given, conduit $19_B$ connects air inlet 20 to pulser 30, and conduit $19_A$ connects the output of air conditioning device 45 to central fan 34 and to a de-misting nozzle 35. Furthermore, conduits 18, in particular in the form of a chute, receive the cable harness, not shown in FIG. 5, for example by clipping.

Block of material 3 can be produced, in particular, by means of a two-part mould provided with slides, capable of forming locations 5 and conduits 18, $19_A$, $19_B$. Furthermore, cross member 4 is, for example, moulded in block 3; for this purpose, it is placed in the mould used to form block 3.

Items 2 are introduced into the locations 5, for example, by force fitting; furthermore, use is also made of the elastic properties of the material to ensure the tightness of the parts of the air conditioning device 45. This thus makes it possible, in particular, to minimize the number of riveting and/welding operations, and facilitates standardisation. Similarly, de-misting and ventilation grilles 35 and loudspeakers 39 are assembled, in particular, by clipping into locations $5_C$, $5_D$, $5_E$.

Other implementations of the present invention, within the grasp of a man of the art, could, of course, have been contemplated without thereby departing from the scope of the present application.

What is claimed is:

1. A vehicle dashboard for allowing an integration of internal instruments and accessories into a cavity in a front body panel of the vehicle, the dashboard comprising:

a solid block of material adapted to fill the cavity, said block of material having at least one location formed in said block of material, said location capable of supporting the internal instruments and accessories, said block of material being supported by at least one rigid crossmember, said rigid crossmember adapted to be secured to the vehicle, said crossmember being accessible from exterior of said block of material through said location.

2. The dashboard according to claim 1, wherein said block of material surrounds said cross member over at least a portion of a length of said cross member.

3. The dashboard according to claim 1, said cross member being a lateral reinforcing bar of the vehicle.

4. The dashboard according to claim 1 wherein said block of material is an expanded synthetic material.

5. The dashboard according to claim 1 wherein said expanded synthetic material is selected from the group consisting of polystyrene and polypropylene.

6. The dashboard according to claim 1 wherein said block of material has a skin affixed at least partially over a surface thereof.

7. The dashboard according to claim 1 wherein said location is adapted to interchangeably support different internal instruments and accessories therein.

8. The dashboard according to claim 1, wherein said block of material defines conduits therein.

* * * * *